(12) United States Patent (10) Patent No.: US 7,821,639 B2
Ehbets et al. (45) Date of Patent: Oct. 26, 2010

| (54) | COLOR MEASURING HEAD AND SCANNER DEVICE EQUIPPED THEREWITH |
|---|---|
| (75) | Inventors: Peter Ehbets, Zurich (CH); Adrian Kohlbrenner, Thalwil (CH) |
| (73) | Assignee: X-Rite Europe GmbH, Regensdorf (CH) |
| ( * ) | Notice: Subject to any disclaimer, the term of this patent is extended or adjusted under 35 U.S.C. 154(b) by 279 days. |
| (21) | Appl. No.: 11/961,456 |
| (22) | Filed: Dec. 20, 2007 |
| (65) | Prior Publication Data |
|   | US 2008/0174763 A1    Jul. 24, 2008 |
| (30) | Foreign Application Priority Data |
|   | Dec. 21, 2006    (EP) .................... 06126907 |
| (51) | Int. Cl.<br>*G01J 3/46* (2006.01) |
| (52) | U.S. Cl. .......... 356/402; 356/407; 356/72; 235/462.13; 235/462.04 |
| (58) | Field of Classification Search ........ 356/402, 356/407, 72, 319, 328; 235/462.13, 462.04, 235/494<br>See application file for complete search history. |

(56) References Cited

U.S. PATENT DOCUMENTS

| 4,081,215 | A |   | 3/1978 | Penney et al. |
| 4,505,589 | A | * | 3/1985 | Ott et al. ............... 356/402 |
| 5,043,571 | A |   | 8/1991 | Keine |
| 5,144,498 | A |   | 9/1992 | Vincent |
| 5,592,294 | A |   | 1/1997 | Ota et al. |
| 6,008,905 | A |   | 12/1999 | Breton et al. |
| 6,028,682 | A |   | 2/2000 | Ott et al. |
| 6,147,761 | A | * | 11/2000 | Walowit et al. ......... 356/425 |
| 7,069,186 | B2 | * | 6/2006 | Jung et al. ............. 702/188 |
| 7,312,874 | B2 | * | 12/2007 | Berner ................ 356/402 |
| 2003/0169421 | A1 |   | 9/2003 | Ehbets |
| 2006/0001739 | A1 |   | 1/2006 | Babayoff |
| 2006/0132777 | A1 |   | 6/2006 | Hubble, III et al. |

(Continued)

FOREIGN PATENT DOCUMENTS

DE           3041375           6/1982

(Continued)

OTHER PUBLICATIONS

European Search Report dated Feb. 4, 2007.

(Continued)

*Primary Examiner*—L. G Lauchman
(74) *Attorney, Agent, or Firm*—McCarter & English, LLP (57) ABSTRACT

A scanner device includes a color measuring, a support surface for a measured object and a drive unit for moving the measuring head across the support surface and for adjusting the height of the measuring head in a direction perpendicular to the support surface. The measuring head is equipped with an illuminating channel and a collection channel. The illuminating channel has a light source and optical means for illuminating the measured object at a measurement site at a mean angle of incidence of 45°. The collection channel has optical means for capturing light emanating from the measured object at the measurement site at a mean collection angle of 0° and coupling it into a light guide, which directs the captured light to a wavelength-selective photoelectric transformer, which resolves it into a number of wavelength ranges and generates an electric measurement signal corresponding to each wavelength range.

28 Claims, 6 Drawing Sheets

U.S. PATENT DOCUMENTS

| | | |
|---|---|---|
| 2006/0192957 A1 | 8/2006 | Frick et al. |
| 2006/0192963 A1 | 8/2006 | Frick |
| 2006/0193512 A1 | 8/2006 | Von Orelli et al. |

FOREIGN PATENT DOCUMENTS

| | | |
|---|---|---|
| EP | 1185077 | 3/2002 |
| JP | 57166530 | 10/1982 |
| JP | 6235660 | 8/1994 |
| JP | 10160573 | 6/1998 |
| JP | 2001264173 | 9/2001 |
| WO | 2006/045620 | 5/2006 |
| WO | 2006/045621 | 5/2006 |

OTHER PUBLICATIONS

European Search Report dated May 25, 2007.
European Search Report dated Sep. 7, 2007.
U.S. Appl. No. 11/958,608, entitled "Spectral Photoelectric Measurement Transformer" (filed Dec. 18, 2007), Inventor: Peter Ehbets.
U.S. Appl. No. 11/961,507, entitled "Scanner Device" (filed Dec. 20, 2007), Inventor: Peter Ehbets and Adrian Kohlbrenner.

* cited by examiner

COLOR MEASURING HEAD AND SCANNER DEVICE EQUIPPED THEREWITH

BACKGROUND OF THE INVENTION

The invention relates to a scanner device of the type for measuring the color properties of a measured object pixel by pixel by means of a color measuring head, which scanner device is able to move the color measuring head in at least one dimension across a measurement object to be measured, and the color measuring head has at least one illuminating channel and a collection channel, which illuminating channel has a light source and optical means for illuminating the measured object at a measurement site at a mean angle of incidence of 45°, and which collection channel has optical means for capturing measurement light emitted from the measured object at the measurement site at a mean collection angle of 0° and coupling it into a light guide which directs the captured measurement light to a wavelength-selective photoelectric transformer, preferably provided in the form of a spectrometer which resolves it into a number of wavelength ranges and generates an electric measurement signal corresponding to each wavelength range.

Published international patent application WO 2006/045621 A1 provides a detailed description of an automated measuring system for quality control and for controlling the color of a printing machine. It essentially comprises a measuring table on which a printed sheet to be measured can be placed, and a measuring unit comprising a beam-shaped line scanner and an individual color measuring head. The line scanner and individual measuring head can be moved above the measuring table by a computer-controlled drive mechanism so that it travels across every pixel of the printed sheet to be measured. The quality and control parameters needed for the printing process are derived from the resultant measurement values. The output parameters generally include color measurement values CIE XYZ and derived colorimetric variables (in accordance with CIE publication 15 and ISO 13655) as well as density measurement values in accordance with ISO 5. The individual measuring head is advantageously provided in the form of a spectral measuring head so that all the output parameters can be computed in a known manner from the measured spectral values of the reflection factor. As a rule, the individual measuring head is used to measure print control strips contained in the printed sheet, whilst the line scanner is used to scan the rest of the printed image content.

In practice, a measuring system of this type, especially the individual color measuring head, is required to satisfy very exacting demands.

In order to control printing machines during continuous printing, the measuring system must be capable of detecting the print control strips and sending feedback to the printing machine as rapidly as possible. This requires a very powerful optical measuring system to enable travel across the measured sample (the printed sheet to be measured) at high scanning speeds. The measuring system must also be immediately ready for use without a long warm-up time and transient response.

The size of the measurement field in the print control strip is tending to become increasingly small, on the one hand in order to save on waste and on the other hand to enable more measurement fields to be provided in the print control strip and control more printing systems with one strip.

Measuring small measurement fields cleanly at a high scanning speed requires a more complex design of measuring optics than is available in the prior art. Parameters such as the sensitivity to distance and positioning accuracy of the measuring head must satisfy significantly higher requirements. Allowance must also be made for the homogeneity of the measurement fields if working with small measuring orifices.

Requirements placed on the measurement range have risen with the introduction of highly pigmented inks, UV-dried inks, the use of high gloss materials and finishing processes involving lacquer coatings. This firstly requires a highly sensitive, low-noise measuring system. In addition, cross-talk from the surrounding area must be actively suppressed to enable effective use to be made of the large measuring range.

Toner powder is used within the printing range. There is no way of ruling out the possibility of the measuring optics becoming dirty over the course of time. Dirt exacerbates the problems associated with the high density measuring range and cross-talk.

The printed sheets are measured in the wet state, directly off the printing machine. The subsequent drying process changes the surface structure of the color layer and hence the measurement values. More stable measurement values can be obtained in a known manner by using orthogonal polarization filters in the illumination and measuring channels. These measuring techniques are used as standard for taking density measurements. Fast-scanning spectral color measuring systems incorporating polarization filter technology are not yet available on the market.

In order to achieve fast measuring cycles, system designs are desirable which are able to detect measurement values with and without polarization filters in one measurement pass.

Typical substrates (papers) used in the printing industry contain optical brighteners, which are excited in the spectral UV range and emit fluorescent light in the visible range. The fluorescent element of the substrate influences the color and density measurement values. Allowance needs to be made for these effects in the application and a stable process measuring technique is necessary. It is also desirable to characterize the proportion of optical brighteners in the paper more accurately to permit an alignment of the measurement values between different measuring devices with different lighting spectra.

In order to obtain a better characterization of a specific printing process, it is of interest to determine other parameters in addition to the reflection factor spectra. In the case of repeat print jobs, these might enable control of the reproduction quality to be improved or may be used to measure special materials (metallic reflecting substrate or metallic inks). Additional parameters include the rotation dependency of the substrate, the amount of optical brighteners in the substrate, measurement of the degree of translucence of the measured sample and a spectral or narrow-band gloss measurement.

The measuring system is used intensively in a production environment and should therefore contain as few parts as possible which might be susceptible to wear. All components, including the light source, must be designed for a maximum service life.

Since it is necessary to measure freshly printed print samples, it is important to have a geometry which hovers freely. The design of the measuring system must be such that it can be adapted to different paper thickness and take account of fluctuations in the planarity of the sample bed.

The scanning measuring systems known to date do not satisfy the requirements outlined above or satisfy only some of them or do so only to an unsatisfactory degree.

The AxisControl measuring system by the Heidelberg company uses a compact spectral measuring head with a two-dimensional drive across a planar sample sheet surface. The measuring head can not hover freely during measuring. The distance is controlled by mechanically placing the measuring head on the sample. The position of the control strip on the sheet must be manually determined with a light pen. The measuring technology is designed for spectral measurements without polarization filters only and typically requires a measuring field size of 5 mm×6 mm.

The Intellitrax measuring system by X-Rite Inc. combines a spectral color measuring head with a tracking sensor, which enables automatic tracking and positioning relative to the print control strip. The optical measuring system is designed so that it operates at a fixed distance from the test sample and must therefore tolerate the entire range of different paper thicknesses. When using standard 45°/0° geometry, the distance tolerances require there to be a correspondingly high peripheral distance between the illuminated and captured surface in the measurement field. For a broad range of paper thicknesses from 0 to in excess of 1 mm, this system restricts the size of the minimum measuring speckle and hence its use for detecting the smallest measurement fields without crosstalk.

The spectral measurement data is detected using a rotating filter wheel. A complete spectrum requires a measurement conducted over a time sequence with every filter position and corresponds to a complete rotation of the filter wheel. Taking measurements based on a time sequence involving a lot of spectral channels limits the minimum measuring time which can be achieved, which restricts the maximum scanning speed and the minimum measurement field size. During the scanning process, measurements are taken with the different filter channels at locally different positions. This positional offset may lead to fluctuations in the measurement values in the case of grid-patterned fields and a small measuring speckle. The measuring device enables a parallel measurement to be taken with and without polarization filters in one scanning pass. To this end, the sample is illuminated with polarized light and the filter wheel contains filters with and without polarization filtering. Since the measurement time is linked to the number of filters, only 3 density filters are used for the polarization filter measurements. The missing spectral values are numerically approximated on the basis of these 3 measurement values.

Another measuring system is described in document DE 195 30 185 C2. The measuring head contains lighting disposed at 0° with permanently fitted polarization filters and two different collection channels, namely a spectral measurement channel without polarization filters and a density measuring channel with polarization filters which can be read out in parallel. On the one hand, the fact of providing two spectral analysis systems in the collection channel leads to additional costs. On the other hand, a complete spectral measurement is not available using polarization filters. The two collection channels scan the measurement field at 45° from different spatial directions. Samples with measurement properties that are dependent on rotation are not evaluated equally by the two collection channels. The problem of distance is solved by creating an air cushion between the measuring head bottom edge and the paper surface, on which the measuring head hovers. A constant working distance is obtained by the air cushion irrespective of the paper thickness.

SUMMARY OF THE INVENTION

It is an objective of this invention to improve a color measuring head and a corresponding scanner device of the generic type equipped with a color measuring head so that they satisfy the demands explained above placed on a modern, high-precision and fast scanning system and in particular are suitable for taking highly accurate measurements of even the smallest measurement fields without contact.

This objective is achieved by a scanner device for measuring the color properties of a measured object pixel by pixel by means of a color measuring head, which scanner device is able to move the color measuring head in at least one dimension across a measurement object to be measured, and the color measuring head has at least one illuminating channel and a collection channel, which illuminating channel has a light source and optical means for illuminating the measured object at a measurement site at a mean angle of incidence of 45°, and which collection channel has optical means for capturing measurement light emitted from the measured object at the measurement site at a mean collection angle of 0° and coupling it into a light guide which directs the captured measurement light to a wavelength-selective photoelectric transformer, preferably provided in the form of a spectrometer which resolves it into a number of wavelength ranges and generates an electric measurement signal corresponding to each wavelength range, characterized in that the optical means in the illuminating channel comprise collimation optics, a field aperture, symmetrical telecentric imaging optics and a polarization filter preferably permanently mounted at the measured object end, and the optical means in the collection channel comprise imaging optics, a field aperture and coupling optics, and the collimation optics collimate the illuminating light emanating from the light source and thus illuminate the field aperture of the illuminating channel essentially homogeneously axially parallel, and the polarization axis of the polarization filter is tilted, oriented at an angle of 45° with respect to the plane of incidence onto the measured object, and the telecentric imaging optics reproduce the field aperture sharply in a measurement plane and thus create an illuminating speckle, and the imaging optics in the collection channel also reproduce the field aperture sharply in the measurement plane within the illuminating speckle and a measurement speckle is defined by the image of the field aperture, and the collection channel captures measurement light emanating only from the measurement speckle and couples it via the coupling optics into the light guide.

BRIEF DESCRIPTION OF THE DRAWINGS

The invention will be explained in more detail below with reference to the appended drawings. Of these:

FIG. 6 illustrates the optical design of one example of the color measuring head, FIG. 6a shows a detail from FIG. 6, FIGS. 7-9 are schematic operating diagrams of three other examples of embodiments of the color measuring head with several lighting channels.

DESCRIPTION OF THE PREFERRED EMBODIMENTS

Figure 1:
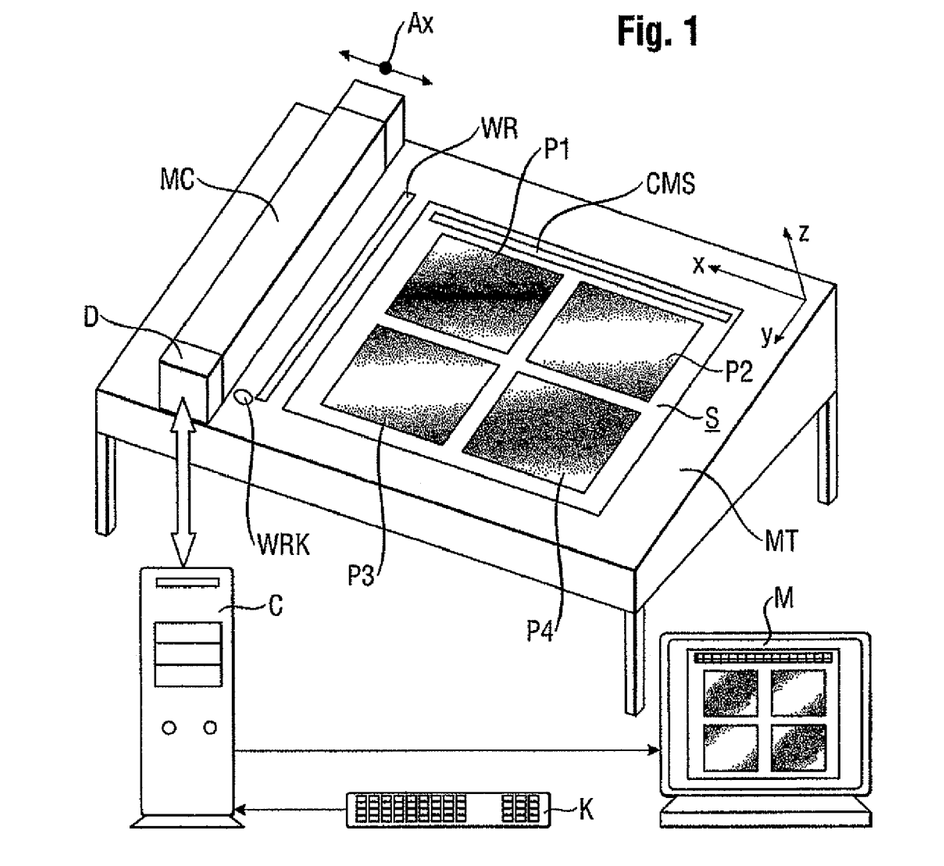
FIG. 1 shows a simplified overall view of one example of an embodiment of the scanner device proposed by the invention.
Figure 2:
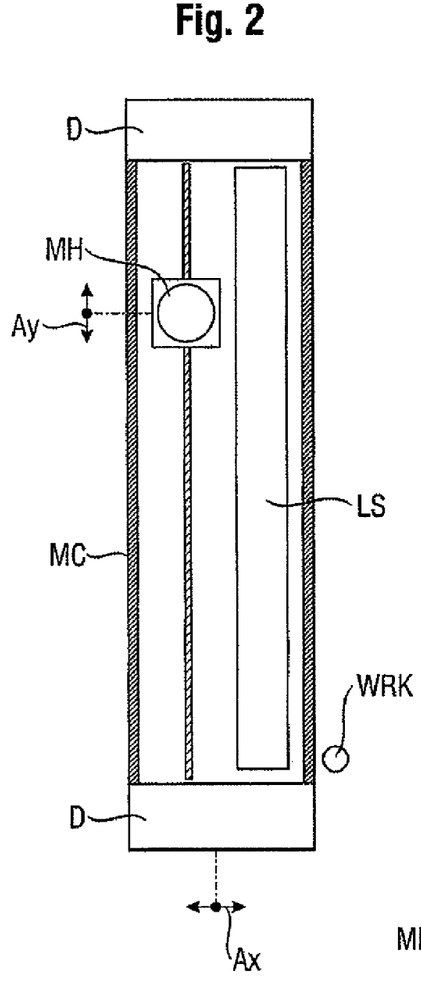
FIG. 2 is a partial longitudinal section parallel with the x-y co-ordinate plane through the measuring carriage of the scanner device.
Figure 3:
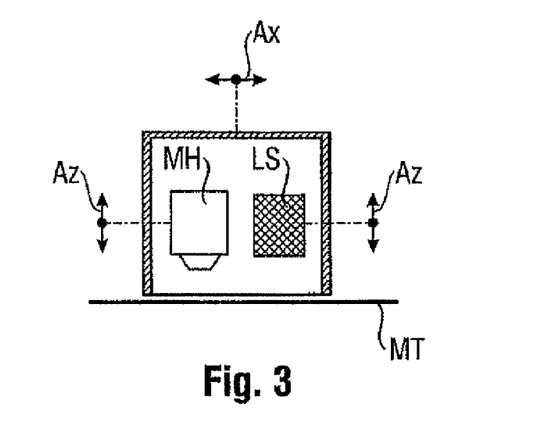
FIG. 3 is a partial cross-section parallel with the x-z co-ordinate plane through the measuring carriage of the scanner device.

In terms of its general construction, the scanner device proposed by the invention conforms to standard measuring apparatus, of the type typically used in the graphics industry for taking photoelectric measurements of printed sheets taken from a printing process on the basis of pixels, for example. The scanner device comprises a sub-structure in the form of a measuring table MT with what is usually an inclined rectangular surface, on which the measured object S—the printed sheet to be measured—can be positioned. The measuring table therefore provides a support surface for the measured object. The printed sheet S typically contains a few (in this instance four, for example) graphic images P1-P4 and a (or several) color measuring strips CMS. In order to position the measured object S, stops are provided on the measuring table MT, although these are not illustrated. The measured object S is preferably secured on the measuring table MT by electrostatic means or by means of known suction mechanisms. Disposed on the measuring table MT is an elongate measuring carriage MC, on or in which a measuring unit is disposed, comprising a beam-shaped line scanner LS and an individual color measuring head MH which is preferably of a spectral design (FIGS. 2 and 3). The measuring carriage MC extends across the depth of the measuring table MT in the y co-ordinate direction and is driven by motor so that it moves linearly backwards and forwards across its width in the x co-ordinate direction, for which purpose appropriate drive and control units are provided on the measuring carriage MC and on or under the measuring table MT. In the drawings, the drive unit is only symbolically indicated by the letter D, and the measuring carriage MC moves in the x direction indicated by arrow Ax. Inside the measuring carriage MC, the line scanner LS and the color measuring head MH can be raised and lowered independently of one another in the z co-ordinate direction relative to the measurement table surface by means of conventional drive systems, not illustrated, as indicated by the arrows Az in FIG. 3. The color measuring head MH can also be moved in the direction of the y co-ordinate axis. These movement options are indicated by arrow Ay in FIG. 2. In conjunction with the movement of the measuring carriage MC in the x direction and the ability to move in the y and z directions, the color measuring head MH can be positioned above any and every image element of the measured object.

The line scanner LS is respectively able to measure a complete line of image pixels of the measured object S and is typically used to detect the image content of the measured object. The individual color measuring head MH is used to take highly accurate measurements of selected image pixels of the measured object and in particular measurement fields of color measuring strips (print control strips). All aspects of the line scanner are described in WO 2006/045621 A1 and it is not the subject matter of this invention.

Disposed on the measuring table MT parallel with the measuring carriage MC is a white reference strip WR. Also disposed on the measurement table close to the edge but still within the detection range of the color measuring head MH is a white reference tile WRK of long-term stability. These two white references are used to calibrate the measuring unit, as will be explained in more detail below.

The scanner device also has a processing device in the form of an external computer C with a keyboard K and a color monitor M. The computer C co-operates with a measurement and drive control unit MDC (FIG. 4) on the measuring table MT or in the measuring carriage MC and processes the measurement signals generated by the line scanner LS and color measuring head MH disposed in the measuring carriage MC and forwarded to it via the measurement and drive control unit MDC, and amongst other things, is also able to display the image data of the scanned measured object S on the monitor M, Via the measurement and drive control unit MDC, the computer C is also able to initiate and control the movements of the measuring carriage MC and the line scanner LS and color measuring head MH disposed in it in the three co-ordinate directions x, y and z.

Figure 5:
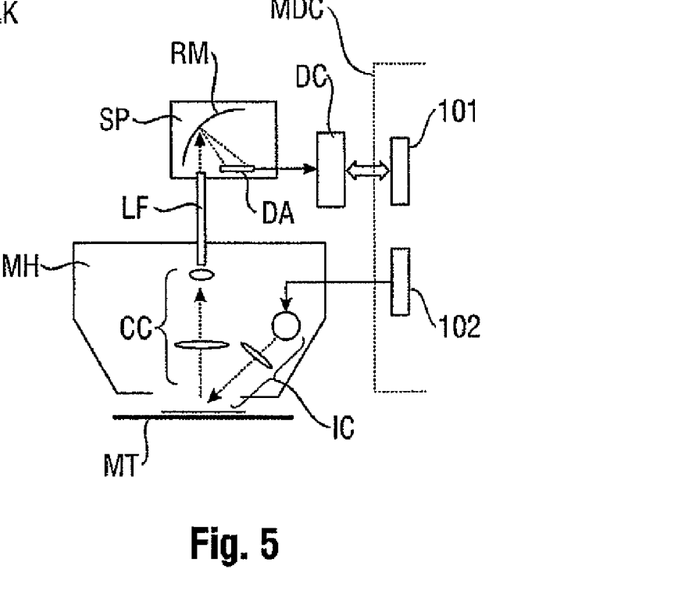
FIG. 5 is a schematic diagram illustrating the basic structure of the color measuring head proposed by the invention.

FIG. 5 illustrates the measurement and drive control unit MDC of the scanner device in the form of a rough block diagram. It comprises a sensor control unit 101, a lamp control unit 102 and a drive control unit 103, as well as a main control unit 104 which co-operates with the other three control units and simultaneously also establishes the connection to the external computer C. The sensor control unit 101 reads out the measurement values from the line scanner LS and color measuring head MH, the lamp control unit 102 controls the light sources of the line scanner LS and color measuring head MH and the drive control unit 103 controls drive motors 108 for moving the measuring carriage MC and the color measuring head MH disposed in it in the three directions of movement x, y and z. The main control unit 104 co-ordinates and controls the other three control units on a higher level and simultaneously also establishes the connection to the external computer C. The main control unit 104 receives control commands 105 from the external computer C and sends the (digitally processed) measurement values 106 generated by the line scanner LS and the color measuring head MH to the external computer. In terms of function, the measurement and drive control unit MDC is in principle the same as that of commercially available scanner devices of this type, and the specific functions necessary for activating the photoelectric converter and light sources of the line scanner LS and color measuring head MH may be taken directly from the specification sheets of the manufacturers of these elements. The person skilled in the art therefore needs no further explanation of how the measurement and drive control unit MDC operates.

The scanner device illustrated in FIGS. 1-4 corresponds to the prior art as described in detail in the above-mentioned patent specification WO 2006/045261, for example. The mechanical construction and design of the motor-driven movements of the measuring carriage and line scanner and color measuring head are described in detail in U.S. Pat. No. 6,028,682 and the skilled person therefore needs no further explanation in this respect. It goes without saying that the measuring carriage MC may also be disposed parallel with the x co-ordinate direction, in which case all other orientations and directions of movement would likewise be rotated by 90° accordingly.

Figure 4:
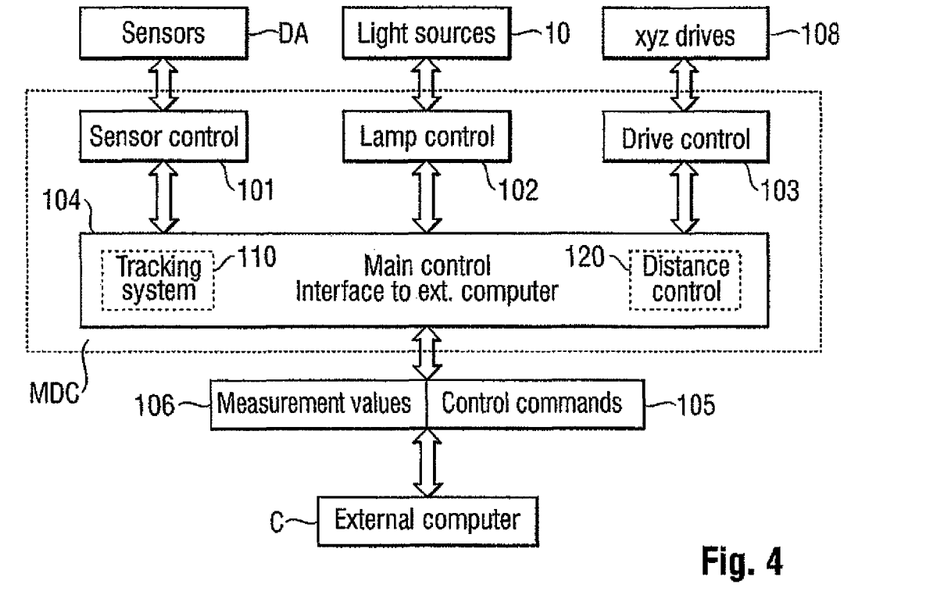
FIG. 4 is a block diagram illustrating how the measuring and control electronics of the scanner device operate.

Also contained in the main control unit 104 are a tracking system (tracking control for the color measuring head) and an active distance control system for adjusting the height of the color measuring head, which are symbolized by the two blocks 110 and 120. A more detailed explanation of these will be given below.

This invention primarily relates to the design of the individual color measuring head MH and related aspects. The invention therefore also relates to scanner devices which are equipped either with only one individual color measuring head MH or have another image scanner device instead of a line scanner. The invention further relates to simpler scanner devices, in which the color measuring head is able to move in only one dimension. However, such scanner devices will then require a precise mechanical stop for the edge of the printed sheet or an accurate system enabling the printer to position the printed sheet manually. The invention further relates to various special aspects of the scanner device which are important with a view to obtaining high-precision measurements.

Figures 6, 6A, 7:
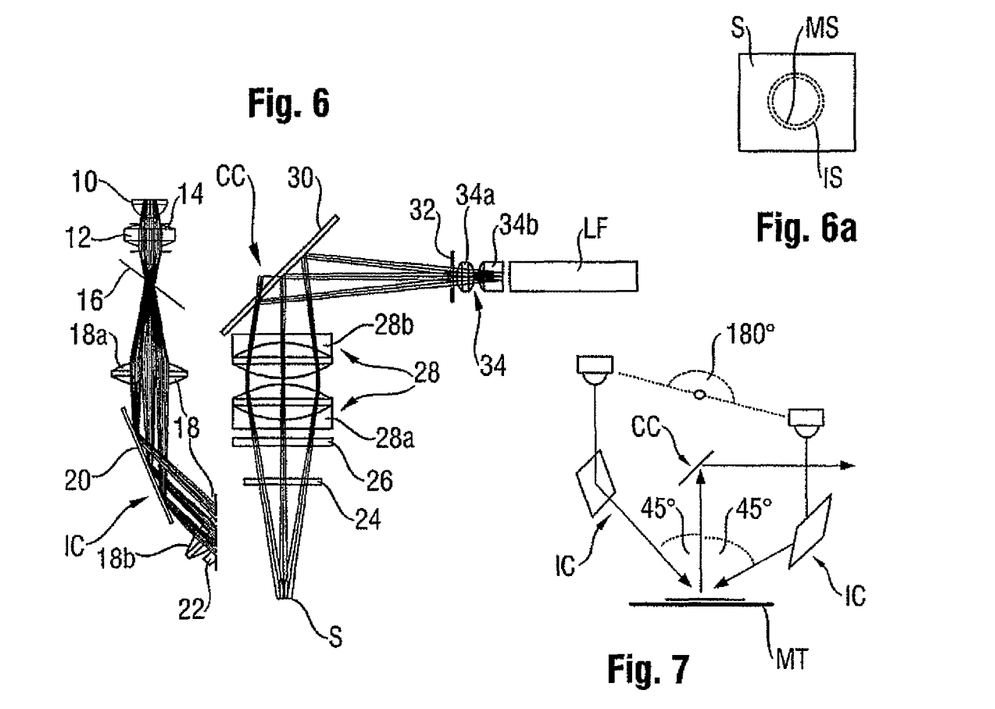

FIG. 5 provides a schematic illustration of the basic construction of the individual color measuring head MH. It comprises an illuminating channel IC, a collection or measuring channel CC, a light guide (optical fiber or light-conducting rod) LF and a wavelength selective-photoelectric converter, which in this instance is a spectrometer SP with a concave diffraction grating RM and a detector array DA (e.g. a diode line detector) and an electronic read-out DC for the detector array DA. The illuminating channel IC illuminates the measured object disposed on the measuring table MT in an illuminating speckle at a (standardized) mean angle of incidence of 45° (by reference to the normal onto the measured object at the measurement site), the collection channel CC captures the measurement light emitted by a measurement speckle on the measured object lying within the illumination speckle at a (standardized) capture angle range of 0°+/−5-10° (by reference to the normal onto the measured object at the measurement site) and couples it into the light guide LF via coupling optics (FIG. 6). The light guide LF directs the measurement light into the inlet gap of the spectrometer SP. In the spectrometer SP, the measurement light is split by the concave diffraction grating RM. The individual spectral elements of the measured light are locally resolved on reaching the detector array DA, where they are converted into corresponding electric signals. The electronic read-out DC reads the detector array DA and directs the spectral measurement signals to the sensor control unit 101 in the measurement and drive control unit MDC. Although not illustrated, the light source in the illuminating channel IC is activated by the lamp control unit 102 in the measurement and drive control unit MDC.

In order to obtain minimum measurement times and a maximum scanning speed, it is of advantage to use a spectrometer which is able to take a simultaneous measurement of the spectral distribution. As illustrated, the spectrometer may be provided in the form of a grating-spectrometer with a diode line detector, which permits a spectral distribution in a diffraction order of the grating with a line or matrix detector. Alternatively, the spectrometer may also be equipped with a number of narrow-band bandpass filters disposed adjacent to one another upstream of the detector array. This naturally obviates the need for the diffraction grating.

In terms of these general details, the color measuring head MH is absolutely the same as known measuring heads of this type and the skilled person therefore requires no further explanation.

The specific design of different examples of embodiments of the color measuring head MH proposed by the invention will now be described in more detail with reference to FIGS. 6-11. The primary objectives are to achieve a light-intensive measuring optical system so that fast measuring cycles can be achieved and a small measuring speckle in order to prevent cross-talk from the surrounding area, especially in the case of very small measurement fields.

FIG. 6 illustrates an example of the simplest embodiment of the color measuring head MH with a single illuminating channel IC. It comprises a light source 10 and various optical means including collimation optics 12, apodization means in the form of an apodization mask 14, a field screen 16, symmetrical, telecentric imaging optics 18 comprising two identical lens systems 18a and 18b, a deflector mirror 20 and a polarization filter 22.

The collection channel CC of the color measuring head MH has optical means in the form of a protective window 24, a polarization filter 26, imaging optics 28 comprising two symmetrical achromatic lenses 28a and 28b, a deflector mirror 30, a field aperture 32 and the coupling optics 34 mentioned above, in the form of two identical lenses 34a and 34b. The telecentric imaging optics 18 reproduce the field aperture 16 sharply in the measurement plane. The illuminating channel IC thus generates an illumination speckle IS on the measured object S to be measured (FIG. 6a), which is essentially defined by the shape and size of the field aperture 16 in the illuminating channel IC. Similarly, the imaging optics 28 reproduce the field aperture 32 in the measurement plane. The collection or measurement channel CC therefore collects only the light from a collection or measurement speckle MS defined by the image of the field aperture 32 within the illumination speckle IS (FIG. 6a), and the size of the collection or measurement speckle MS is defined by the shape and size of the field aperture 32 in the collection channel CC.

The sizes of the illuminating speckle and the collection or measurement speckle are selected on the basis of appropriate dimensioning of the field apertures 16 and 32, so that when the scanner device is in scanning measurement mode, a minimum of one measurement, even better two measurements, is disposed above the measurement field to be measured complete with illumination and collection. This eliminates three-dimensional cross-talk from the surrounding area and even the smallest measurement fields with high densities can be correctly measured.

A light-intensive system is achieved when the spectrometer is fully illuminated. In other words, with the measurement speckle in this disposition, the measured object is illuminated from above. Since the system is preferably equipped with several illuminating channels (FIGS. 7-9), the collection channel is disposed at 0° and the illuminating channel at 45° in a known manner.

To enable the color measuring head MH to hover freely above the measured object, it must also have a certain range of tolerance irrespective of distance. If the measurement distance changes, the illuminating speckle shifts laterally relative to the measurement channel or measurement speckle, in addition to de-focusing. To obtain a constant signal level, therefore, the illuminating speckle must illuminate the measured object homogeneously with a telecentric optical path so that every point in the measurement plane sees the light source within the distance tolerances at a constant beam angle. This arrangement also enables a uniform angular evaluation across the measurement sample surface.

The light source emits a white continuous spectrum across the spectral range of 400 to 700 nm. White LEDs are preferably used as the light source. However, other commonly available light sources such as glow lamps could also be used. Individual high-power LEDs or a plurality of small, low-powder LED chips might be used for the LED light source, which are disposed on a common substrate in a compact format using chip-on-board technology.

The light from the light source 10 is collimated by means of the collimation optics 12 so that an axially parallel optical path is generated in the region of the field aperture 16. In the embodiment illustrated as an example, the collimation optics 12 are provided with an aspheric lens. Alternatively, they may also be provided in the form of an optical guide bar with a cross-sectional transformer. The illumination in the region of the field aperture is relatively homogeneous and is bounded by a typical boundary fall-off (cos ^4 fall-off). Improved homogeneous illumination is obtained if the apodization mask 14 is inserted in the optical path between the LED and collimation optics. This mask weakens the central signal level relative to the boundary areas so that constant illumination is achieved. The apodization mask 14 may be provided in the form of a non-transparent small dot, which is disposed on the optical axis. Ideally, the dot is directly applied to an optical surface of the collimation optics 12. However, it may also be disposed on an additional transparent substrate, as illustrated in FIG. 6.

Figures 10, 11:
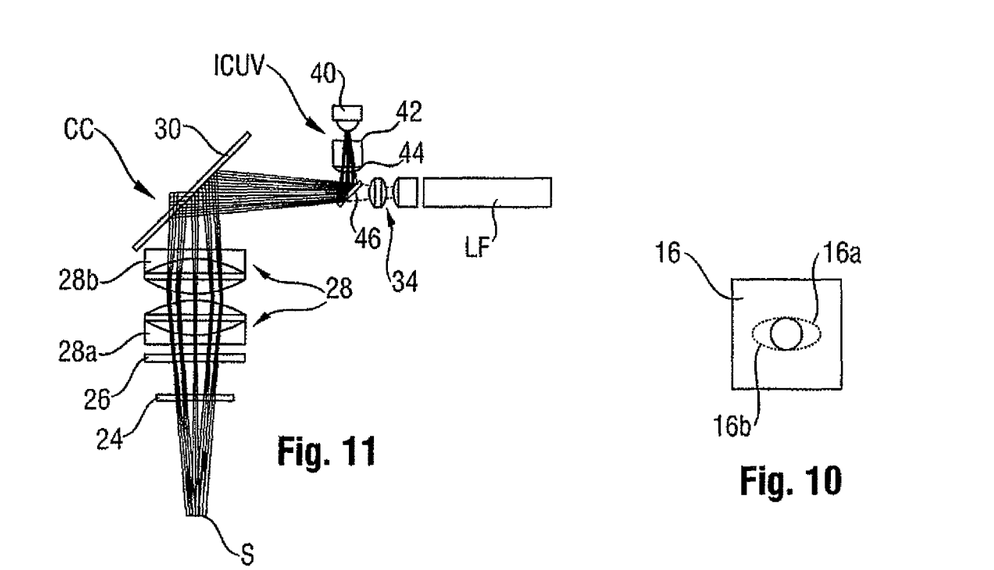
FIG. 10 illustrates a field measuring orifice of the color measuring head
FIG. 11 is a detail of another example of an embodiment of the color measuring head with an additional UV illuminating channel.

Since the color measuring head is designed for print control applications and must therefore also be capable of measuring patterned samples, the orifice of the field aperture 16 preferably has a round contour. As illustrated in FIG. 10, the aperture orifice 16a is circular. Alternatively, the aperture orifice 16b may also be of an elliptical shape.

The field aperture 16 is disposed downstream of the collimation optics 12 in the telecentric optical path. The plane of the field aperture 16 is tilted by 45° with respect to the optical axis so that the sharp image plane falls within the measurement plane at the selected 45° illumination geometry. The field aperture 16 is reproduced in the image plane by means of a symmetrical optical system comprising two identical lens systems, which contains the telecentric optical path in the aperture plane and reproduces the image plane. The deflector mirror 20 tilted by 45° is inserted between the two symmetrical lens systems 18a and 18b of the imaging optics 18. It creates the 45° angle of illumination in the measurement field and enables a more compact design of the color measuring head MH to be obtained.

It is preferable to use aspheres for the imaging optics 18. The lenses of the imaging optics 18 and the collimation optics 12 may be produced inexpensively in the form of injection-cast plastic lenses.

Permanently integrated at the measured object-end optical path at the output of the illumination channel IC is the linear polarization filter 22. The co-operating polarization filter 26 in the collection channel CC is of a switchable deign so that the color measuring head MH is able to operate in a mode both with and without polarization filter. The term switchable should be understood as meaning that the polarization filter 26 can be moved out of the optical path of the collection channel CC or placed in it, as symbolized by arrow 26a indicated in FIG. 6. Alternatively, this switching function may also be set up using electrically switchable polarizing means, for example based on liquid crystal material.

To enable the color measuring head to take measurements in the collection channel CC with the polarization filter 22 permanently integrated in the illumination channel IC but with the polarization filter 22 switched off (removed) in exactly the same way as a system without any polarization filter at all, the polarization axis of the polarization filter 22 is tilted by 45° with respect to the plane of incidence onto the measured object.

The collection channel CC in the color measuring head MH must be able to hover freely as it measures the measured object. To achieve a minimum field of vision, the collection channel reproduces the field aperture 32 sharply in the measurement plane. In FIG. 6, two symmetrical achromatic lenses are used for imaging purposes. The height of the collection channel CC and hence the entire color measuring head MH is reduced due to the deflector mirror 30, which deflects the beam bundle of the measurement light by 90°. Downstream of the field aperture 32, the beam bundle is coupled into the spectrometer SP by means of the coupling optics 34. The coupling optics 34 adapt the numerical aperture to the spectrometer SP and create homogeneous illumination through the inlet surface of the light guide LF. As illustrated in FIG. 6, it is provided with two individual lenses 34a and 34b so that a telecentric optical patch is created at the optical fiber end.

The measurement light picked up from the collection channel CC is directed from the collection channel CC to the spectrometer SP by the light guide LF (optical fiber or optical guide bar). In order to increase coupling efficiency to the spectrometer, it is of advantage to provide the optical light guide LF in the form of a fiber bundle with a cross-sectional transformer. In this case, the outlet surface of the light guide bundle is adapted to the usually rectangular geometry of the inlet gap of the spectrometer SP.

The performance of the color measuring head may be impaired by dirt. Toner powder or dust deposited on the optical surfaces creates scattered light, which affects the density measurement on the small measurement fields. The collection channel CC is particularly critical because it defines the field of vision of the measuring optics. In order to prevent the effects of dirt, the protective window 24 is integrated in the collection channel CC as a first optical element. This protective window is preferably secured in the housing of the color measuring head MH so that the user can simply push it into and out of the external face of the measuring head. Once it becomes dirty, the user therefore replaces the protective window 24 regularly with a new, clean protective window. This avoids costly service intervention to clean the measuring head.

The embodiment of the color measuring head MH illustrated as an example in FIG. 6 has only a single illuminating channel IC. However, the color measuring head is preferably provided with two or four or even yet other illuminating channels, which significantly increases the measurement performance and application range of the color measuring head.

In the embodiment illustrated as an example in FIG. 7, two illuminating channels IC are provided, which lie diametrically opposite one another by reference to the collection channel CC (angular distance 180°), so that the measured object is illuminated from two opposite sides.

Figure 8:
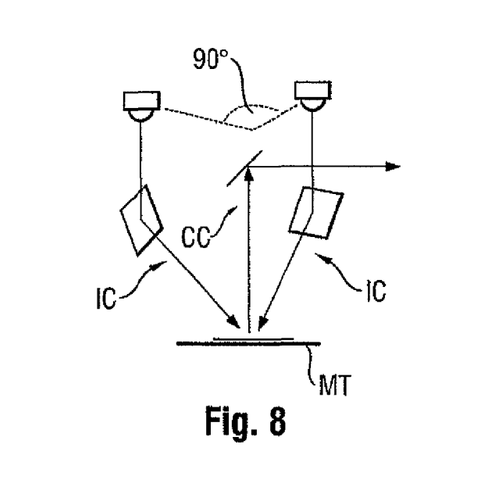

In the embodiment illustrated as an example in FIG. 8, two illumination channels IC are provided, but offset from one another by an angle of 90°, so that light is applied to the measured object from two spatial directions perpendicular to one another. This configuration is practical because it enables rotation-dependent radiation effects of measurement samples to be detected.

Figure 9:
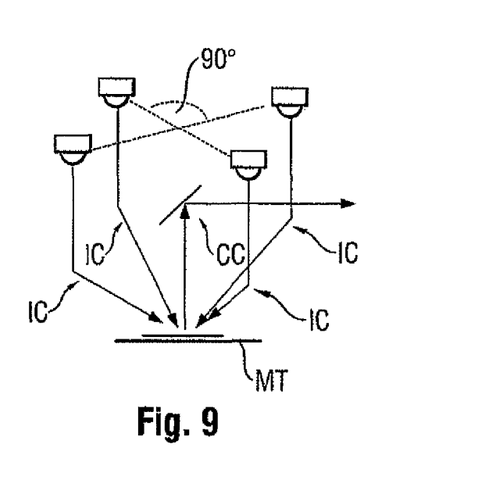

In the embodiment illustrated as an example in FIG. 9, finally, four illuminating channels IC are provided, disposed at an angle of 90° each around the collection channel. This example of an embodiment of the measuring head MH offers the greatest flexibility, as will be explained in more detail below. In the embodiments illustrated as examples in FIGS. 7-9, all of the illuminating channels are essentially of the same design as the illuminating channel IC described in connection with the embodiment illustrated as an example in FIG. 6.

The particularly preferred 4-channel design illustrated in FIG. 9 additionally permits two-sided illumination in the two orthogonal axes, which increases robustness compared with the system of tilting the sample surface at an angle with respect to the color measuring head and further reduces rotation-dependent radiation effects.

The four illuminating channels may be individually controlled. This permits a measurement for every angular direction and enables the angle-dependent scatter behavior of the measurement sample to be characterized.

Each of the two or four illuminating channels IC reproduces a field aperture 16 in the measurement field plane so that the two or four aperture images lie perfectly congruently in the image plane. This results in an illuminating speckle in the measurement field plane with sharply defined boundaries. The aperture images of the different illuminating channels are moved in the measurement field plane so that they overlap one another at a desired distance by adjusting the components, in particular the field apertures.

As mentioned above, the shapes of the illuminating and collection speckles are determined by the corresponding field apertures in the measurement channels. The shape is flexible and may be adapted to the format of the measurement fields. In the case of asymmetrical measurement fields which have a greater height than width in the direction of the print control strip, it is of practical advantage to choose a similar asymmetry for the shape of the measurement speckle. This imparts flexibility to the application. The color measuring head can therefore be used for different applications merely by inserting different aperture sets.

The color measuring head may also have different aperture sizes in the different illuminating channels. This will then enable the color measuring head to take measurements with different peripheral distances between the illuminating speckle and collection speckle by taking measurements individually with the corresponding illuminating channels. Taking measurements at different peripheral distances enables the translucence properties of the measurement sample to be determined. During the printing process, this possibility may be used to set the quality of the material used for subsequent jobs with the same properties.

Different LEDs with different illumination spectra may be used in the individual illuminating channels. The spectra may be selected so that a better signal level is generated in the spectral boundary ranges, for example. White LEDs may be used in conjunction with narrow-band blue LEDs, for example. Another alternative is to select white LEDs with different pump wavelengths in the shortwave range, thereby resulting in a combined spectrum with properties which better lend themselves to the measuring technology. The light sources are advantageously all disposed in one plane, so that they can be assembled on a common support. In the embodiments of the color measuring head described as examples so far, measurements must be taken with and without polarization filters in two separate measurement passes (e.g. a forward pass and a backward pass—once with and once without a polarization filer connected in the collection channel CC). These measurement values are thus continuously evaluated so that regular recommendations can be forwarded to the printing machine with out any time delay.

With the embodiment of the color measuring head MH illustrated as an example in FIG. 9, the measurement can be taken with and without polarization filters in just a single scanning movement by making only a slight modification. For this situation, the polarization filter 26 is permanently integrated in the collection channel CC. Two illuminating channels IC offset from one another by 90° have a permanently integrated polarization filter 22. The two other illuminating channels IC, likewise offset from one another by 90°, do not have polarization filters. The light sources 10 are LEDs, which can be modulated vary rapidly. During the measurement process, a measurement is initiated with each of the two illuminating channels very rapidly in succession and then with the two illuminating channels without polarization filters. The aperture sizes (and hence the sizes of the illuminating and measuring speckles) and the displacement speed of the color measuring head are selected so that a complete measurement can be taken with and without polarization filters on one and the same measurement field in each case. Since the two measurements are run with the same collection channel, a complete spectrum is detected with and without polarization filters.

Using plastic lenses in the illuminating channels and using permanently integrated polarization filters weaken the UV element in the illumination. This being the case, it is of practical advantage to define the illumination as UV-cut filters and eliminate an all-purpose UV element defined with additional filters. This variant lends itself well to control of the process. However, optical brighteners in the substrate (measured object, printed sheet) which are excited in the UV range can not be detected with this system.

To this end, another example of an embodiment of the color measuring head MH is one with an additional UV illuminating channel ICUV provided with a UV-LED 40 as a light source. The UV-LED 40 is mounted on the same support as the light sources 10 (white LEDs) of the other illuminating channels IC. The light of the UV-LED 40 is detected by means of a condenser lens 44 and illuminated with an aperture 42. A dichroic filter 46 which reflects the UV light and is transparent to the light in the range of 400 nm to 700 nm reflects the UV light into the optical path of the imaging optics 28 in the collection channel CC. The imaging optics 28 then reproduce the aperture 44 in the measurement plane. For this example of an embodiment, the achromatic lenses 28a and 28b used for imaging must be made from UV-transparent material (glasses). Integrating the UV illuminating channel ICUV in the collection channel CC saves on costs and facilitates adjustment. Due to the 0° angle of illumination, there is no dependency on distance.

Figure 12:
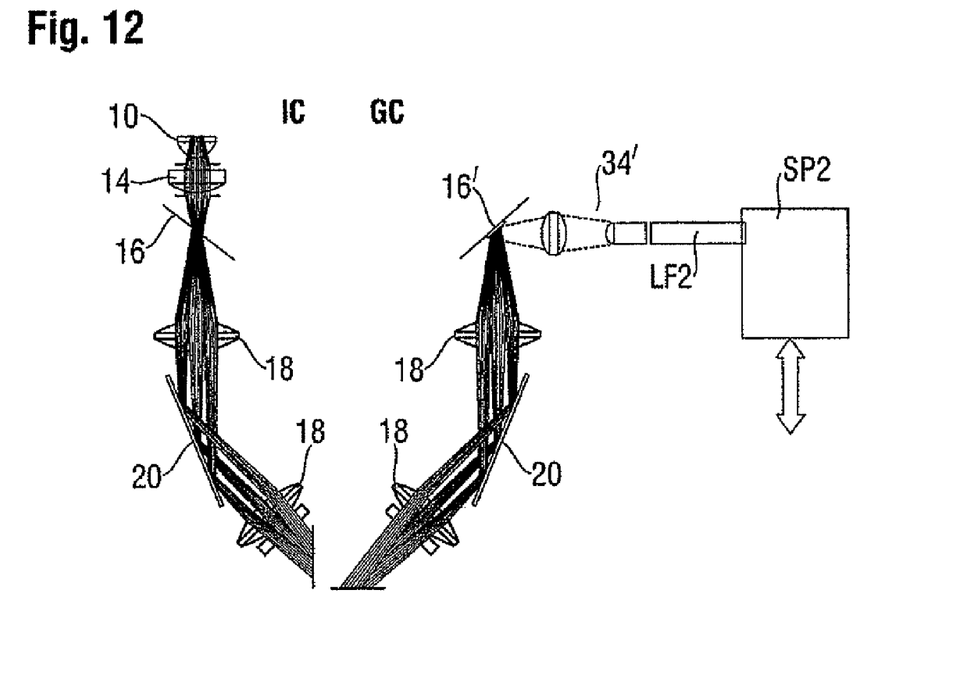
FIG. 12 is a detail of another example of an embodiment of the color measuring head with a gloss measuring channel, FIG. 13 plots measurement curves explaining how the correct measuring distance of the color measuring head above a measurement point is determined.
Figure 13:
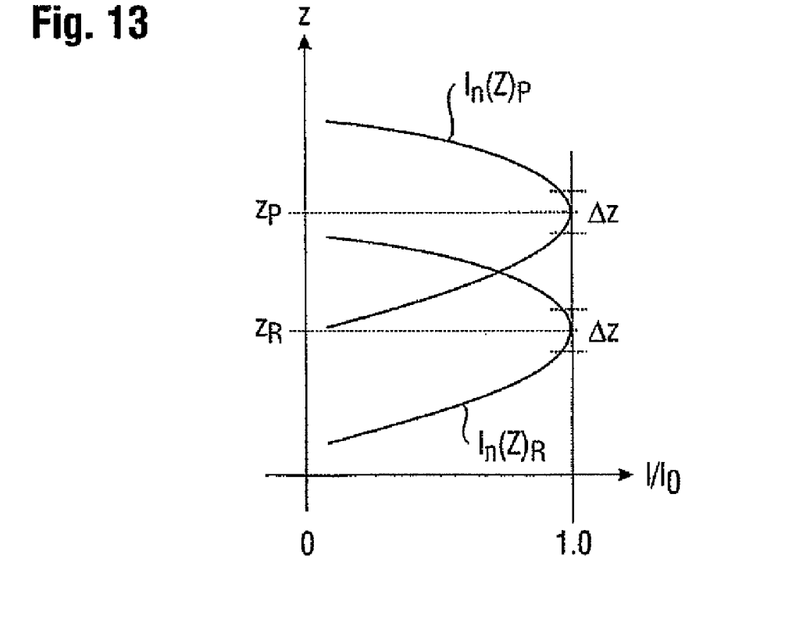

In the embodiment illustrated as an example in FIGS. 12 and 13, a gloss measuring channel GC disposed at 45° is additionally provided in the color measuring head MH. To this end, one of the two (or four) illuminating channels IC is set up slightly differently. The measured object is illuminated at an angle of 45° by the illuminating channel IC lying diametrically opposite the gloss measuring channel GC. The gloss measuring channel GC detects the light reflected from the measured object at 45° and, with the exception of the light source 10 and the collimation optics 12, incorporates the same optical components as the illuminating channel IC. The imaging optics 18 reproduce the measurement light in the plane of the field aperture 16' provided in the form of a deflector mirror in this instance. The aperture size is smaller than that of the field apertures in the other illuminating channels IC. In the part which is optically active, the field aperture 16' is provided in the faun of a mirror, which deflects the optical path. Disposed downstream of the field aperture 16' are coupling optics 34' similar to those provided in the collection channel CC, which couple the measurement into a light guide LF2 and direct it to an additional spectrometer SP2. In this example of an embodiment, the color measuring head offers two spectral measurement channels for a diffuse and a directed measurement geometry. The directed gloss measurement geometry permits the measurement of metallically bright samples which are not correctly evaluated with the diffuse 45°/0° geometry.

In order to function, the scanner device proposed by the invention must run an absolute white measurement. In the case of known scanner devices of this type, the absolute white measurement is usually obtained by moving a calibrated white reference to a point disposed on the measuring table and measuring it. In the case of the scanner device proposed by the invention, two different white references are used, namely the conventional white reference tile WRK of long-term stability, which is absolutely calibrated externally before being fitted and is disposed somewhere in the scanner device that is protected as far as possible from dirt (FIG. 2), and the white reference strip WR, which is mounted on a side of the measuring table MT across the entire side length (FIG. 1). It is not necessary to use a material of long-term stability for this strip. The reference values for the absolute white across the entire length of the white reference strip WR may be derived on the basis of a transfer measurement taken by the color measuring head MH from the white reference tile WRK.

To take the transfer measurement, the color measuring head firstly runs a white calibration on the white reference tile WRK. This corresponds to a measurement at the desired distance. The spectral calibration values of the white reference tile WRK (stored in the system) are correlated with the spectral measurement values. The color measuring head then measures the white reference strip WR at the desired distance at a number of positions distributed across the entire length. From these measurement values, a corresponding white spectrum is calculated by interpolation at every random position, which is used by the color measuring head for the subsequent white adjustment at this position.

Another alternative procedure is possible and is as follows. When setting up the print job, the printer or user pinpoints position of the print control strip for the color measuring head on a first printed sheet. This may be done by means of an optical position pointer, for example a laser pointer, which is integrated in the measuring head housing and illuminates the measurement sheet at a known position relative to the measuring position. During this procedure, the color measuring head firstly takes an absolute white measurement on the white reference tile WRK and then moves to the corresponding position above the white reference strip WR. At this position, the color measuring head then takes a measurement and fixes a local reference value. This position corresponds to the stationary position of the color measuring head for the entire print run. A white adjustment is run at this position before and/or after the measuring routine with every measurement of the sheet.

Once the transfer measurement has been run, other white measurements may be run during subsequent measuring routines on the white reference strip WR taking account of the transfer measurement, which takes place much faster because the measuring head does not have to move alongside the white reference tile WRK (normally disposed to the side of the scanning area). The transfer measurement must be repeated at regular intervals in time in order to compensate for the effect of dirt. Two corresponding absolute white calibrations must be stored in the scanner device for taking the measurements with and without polarization filters. The two reference values must also be transferred to the white strip by means of measurements taken with both filters.

By virtue of one essential aspect of the invention, the correct measuring distance in the z direction with respect to the white reference strip WR and also with respect to the white reference tile WRK is determined by a series of measurements at different heights and a determination of the desired distance based on a criterion. The criterion selected might be the mid-point of the height range (z range) at which the variation of all measurement values measured in this range is minimal. This process of determining the correct measuring distance (desired measuring distance) is also described in more detail below with reference to FIG. 13. However, the white reference strip WR may also be measured with the measuring head at the desired distance above the printed sheet and the measurement result corrected by computation. This will be explained in more detail below.

Similarly to the known Intellitrax system mentioned above, the scanner device proposed by the invention is preferably equipped with a tracking control system (tracking system) for the color measuring head MH. The tracking control system is operated on the basis of a program in the main control unit 104 of the measurement and drive control unit MDC and is symbolized by block 110 in FIG. 4. It is able to evaluate the measurement signals of the line scanner LS in order to locate the print control strip CMS on the printed sheet S, for example. However, it is preferable to provide a separate, short miniature line scanner for the tracking control system which is mounted on the color measuring head MH and moves with it, the signals of which are likewise evaluated by the measurement and drive control unit MDC. The tracking control system enables the lateral measuring position to be actively controlled with respect to the longitudinal direction of the print control strip on the printed sheet when the color measuring head is taking measurements.

When setting up a new print job, the printer must position the color measuring head in the scanner device on a one-off basis so that the print control strip on the sheet is disposed in the capture range of the tracking control system. The color measuring head is then disposed in this stand-by position with the measuring orifice above the white reference strip WR in readiness for running continuous white measurements. During a subsequent measuring run, the printer then merely has to place the sheet with the print control strip within the capture range of the tracking control system. The color measuring head can then automatically take the measurement with a minimal travel time. The time needed to take a white measurement of the pixel-based white reference tile WRK is dispensed with. An automatic white adjustment is run on the strip before and after the series of scanning measurements. A level drift of the measuring system as a function of time can be detected from the two white measurements and also compensated between the two measurement values by interpolation.

As mentioned above, in order to take high-precision measurements, it is important to keep the peripheral distance between the illuminating and measurement speckles of the color measuring head MH on the measured object S as small as possible. In the case of the 45°/0° measuring geometry used, the size of the peripheral distance depends on the sum of all variances which occur in the z direction (height variances) plus adjustment errors, and contains the maximum planarity error of the measurement bed (bed surface or measuring table MT) across the entire measurement surface, the positioning accuracy of the capture speckle relative to the illuminating speckles and the imaging sharpness in the region of the edges of the illuminating speckle and collection speckle.

For reasons of cost, it is common practice not to place too high a specification on the planarity of the support surface (measuring table MT) when working with bigger print formats. However, since this increases the peripheral distance between the illuminating speckle and the collection speckle accordingly, the scanner device is equipped with an electronic distance control system in the measurement and drive control unit MDC by virtue of a main aspect of the invention. The distance control system measures the fluctuations in distance from the bed by means of a distance sensor attached to the housing of the color measuring head, for example, and initiates a distance correction with the drive in the z direction accordingly, so that the color measuring head MH is disposed at the same (desired) distance above the bed (the measuring table) at every point.

By virtue of another aspect of the invention, it may also be preferable for the active distance control system to operate without constantly taking a distance measurement by means of a distance sensor. To this end, when preparing to switch on the scanner device, the planarity of the support surface (measuring table MT) is measured by reference to the mechanical holder of the color measuring head MH at a number of measurement points across the entire measuring table surface. The measurement points may be selected so that they form a regular measurement pattern, for example. The distances of the measurement points in the measurement pattern are selected depending on the local pitch of the distance variation and the required accuracy. The co-ordinates (x, y) of the measurement points as well as the determined distances (absolute heights) of the color measuring head at the correct desired measuring distance above the measurement points are stored in the measurement and drive control unit MDC as planarity values. To a certain extent, they constitute a height and depth profile of the surface of the measuring table with respect to a reference plane based on the two axes of movement x and y of the color measuring head MH. By means of a numerical interpolation between the measurement points of the measurement pattern, a corresponding desired height of the color measuring head can be calculated for every position of the measuring table or its surface and then used to control the distance.

Whilst the scanner device is being prepared, the distances (heights) may be measured by means of a distance sensor, which is temporarily attached to the holder of the color measuring head MH. By virtue of another aspect of the invention, however, these height or distance measurements may be taken by the color measuring head MH itself. The advantage of this method is that the planarity measurement can be repeated at a later point in time if necessary, without additional auxiliary means.

For this design of the distance control system which will be explained with reference to FIG. 13, different height positions z varied in small stages respectively are measured at every measurement point of the signal level generated by the color measuring head MH (e.g. the brightness I at the measurement point calculated from the individual spectral values). The height is adjusted in the z direction by means of the drive control unit 108. The series of measurements of the signal level I is normalized at every position with respect to the respective maximum value JO. The curves of the signal level normalized as a function of the z position are identical at every measurement point. In FIG. 13, two such normalized curves $I_n(Z)_R$ and $I_n(Z)_P$ are plotted for two measurement points R and P respectively. The absolute desired height of the color measuring head MH corresponding to the desired measuring distance is now clearly determined at every measurement point of the measurement pattern on the basis of an identical criterion. To this end, one option is to set the desired height as being the mean z value of a z-range $\Delta z$ fixed in terms of its width, where the z position of the z-range $\Delta z$ is determined so that the variation of the (normalized) signal level lying within it is minimal. In FIG. 13, $Z_R$ and $Z_P$ denote the mean z values for the two measurement points R and P determined in this manner. The corresponding mean z values at each measurement point then give the absolute desired heights of the color measuring head above the measurement points (on the measuring table surface) and are stored as described together with the x, y coordinates of the measurement points of the measuring pattern for subsequent use in the active z-adjustment of the color measuring head MH to the correct desired measuring distance.

Only planarity errors of the measuring table surface are compensated by the active height and distance control system described above, but not the different thicknesses of the measured object (paper thicknesses). The distance control system is equipped with a paper thickness correction function for the latter purpose.

When setting up the print run, the distance control system determines the paper thickness used on the first printed sheet to be measured. To this end, the color measuring head automatically moves to a (random) position on the printed sheet. The desired height of the color measuring head is then determined in the z direction in which the color measuring head should be positioned at the correct desired measuring distance above the surface of the printed sheet. This can be done by running the measurements described above with the color measuring head at different height settings and the series of measurements generated is used to determine the height (z position) of the color measuring head corresponding to the correct desired measuring distance. The z difference between this height and the desired height for the point on the measuring table surface lying underneath (determined during the planarity measurement) gives the paper thickness.

At the start of the operation of measuring subsequent printed sheets, the color measuring head is in the stand-by position at the desired height above the white reference strip WR belonging to the correct desired measuring distance. In the acceleration phase of the scanning movement between the white reference strip WR and printed sheet S, the distance control system corrects the height position of the color measuring head (whilst simultaneously compensating for the planarity) for the paper thickness so that the measurements, which lie above the printed sheet, can be taken at the correct desired measuring distance. The setting or adjusting movement of the color measuring head MH to the height needed for the correct desired measuring distance may alternatively be effected in the same way as with the planarity measurement by means of a conventional distance sensor and a control system activated by it. However, this requires additional equipment.

In one particularly practical alternative approach, the color measuring head may also be disposed in the stand-by position at the start of the measurement run at a height which corresponds to the correct desired measuring distance at the leading edge of the printed sheet. Accordingly, the stand-by position is in front of the white reference strip WR in the x direction. When the color measuring head moves above the white reference strip, the white measurement (is usually) taken at an "incorrect" height. To ensure that a quantitatively correct white measurement can nevertheless be taken, the measurement which was taken at the incorrect height must be converted into a measurement result corresponding to the correct height above the white reference strip WR. A correction factor for each spectral measurement value is needed for this purpose. The correction factors may be determined from the (spectral) height-intensity function (FIG. 13) run during the focusing measurement on the white reference strip. This measurement at the incorrect height above the white reference strip is of practical advantage in particular if the color measuring head is fitted with the miniature line scanner as a tracking sensor mentioned above. In practical terms, it is disposed in the x direction at a distance of approximately 10 cm from the measuring speckle of the color measuring head, i.e. the measurement of the tracking sensor is ahead of the measuring speckle of the color measuring head. Had the white reference strip been measured with the color measuring head at the correct desired height, this would have meant that the tracking sensor running ahead would start scanning the printed sheet at an incorrect height under certain circumstances. This would make it more difficult or impossible to obtain a correct "line-up" on the color measuring strip in some situations.

Figure 14:
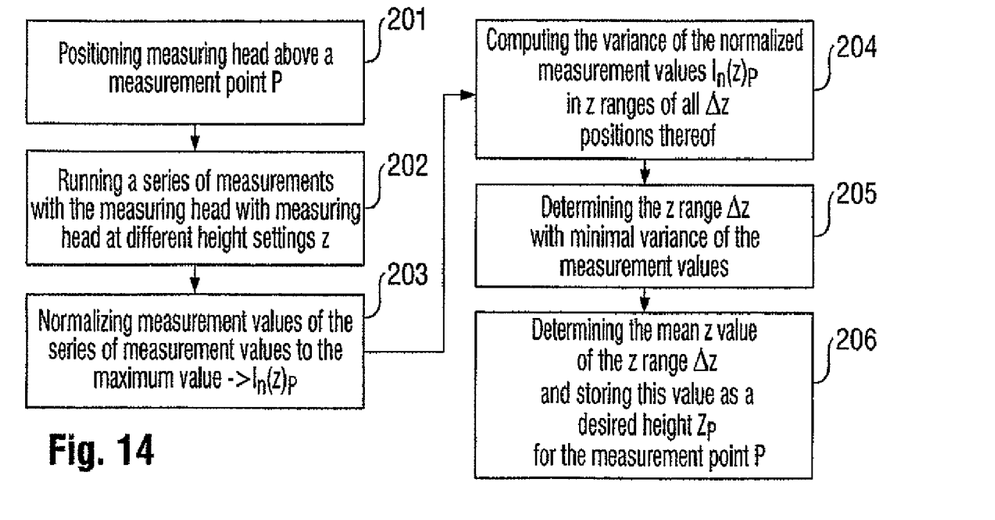
FIG. 14 is a block diagram illustrating how the correct measuring distance of the color measuring head is determined and FIG. 15 is a block diagram showing an active height or distance control procedure for the color measuring head.
Figure 15:
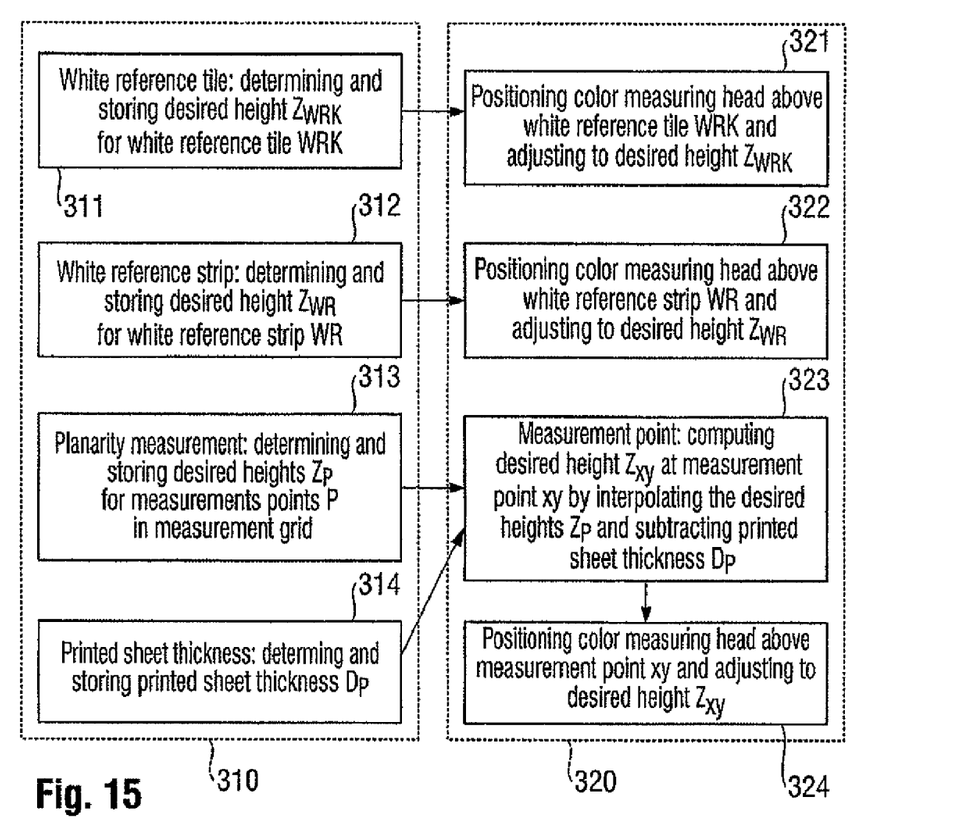

FIGS. 14 and 15 illustrate the individual steps of the active height or distance control procedure described above, again providing an overall view in the form of a block diagram.

As illustrated in FIG. 14, in order to determine the desired height of the color measuring head above a measurement point P, the color measuring head MH is positioned above the measurement point (block 201), The color measuring head is then set to different heights z and a measurement is taken at every height z (block 202). The series of measurements obtained as a result is normalized to its maximum value (Block 203). The variance of the normalized measurement values for z ranges Δz is then calculated for all the possible z positions of these ranges (block 204). The z range for which the variance is minimal is then determined (block 205). Finally, the mean z value of this z range with the minimal measurement value variance is finally determined and stored as a desired height $Z_P$ for the relevant measurement point P (block 206).

FIG. 15 illustrates how the active height and distance control system operates. It comprises two groups of functions, respectively grouped by boxes 310 respectively 320. The preparatory function steps are contained in box 310 whilst box 320 contains the actual control steps which take place during the different measuring routines.

In block 311, the desired height $Z_{WRK}$ of the color measuring head above the white reference strip WRK is determined and stored, following the routine of FIG. 14.

In the same way, the desired height $Z_{WR}$ of the white reference strip WR is determined and stored in block 312. If necessary, several desired heights may also be determined at different positions of the white reference strip.

The planarity measurement of the measuring table surface takes place in block 313, whereby the desired heights $Z_P$ of the color measuring head are determined on the basis of a grid of measurement points P on the measuring table surface and stored. Here too, the procedure is as illustrated in FIG. 14.

In block 314, finally, the thickness $D_P$ of the printed sheet to be measured is determined and stored. This also takes place in the manner illustrated in FIG. 14.

After these preparatory measurements or steps, the scanner device is ready for taking the actual measurements.

In order to measure the white reference tile WRK, the color measuring head is positioned above it and adjusted to the stored desired height $Z_{WRK}$ (block 321). The white measurement is then taken.

In order to measure a point of the white reference strip WR, the color measuring head is positioned above this point and adjusted to the desired height $Z_{WR}$ stored for this point (block 322). The white measurement is then taken.

In order to measure a measurement point of the printed sheet with the co-ordinates xy, the requisite desired heights $Z_P$ of the grid points P are calculated taking account of (subtracting) the thickness $D_P$ of the printed sheet (block 323). The color measuring head is then moved to the measurement point xy and as it is so is simultaneously set to the calculated desired height $Z_{xy}$ (block 324). The measurement point xy is then measured.

The function blocks schematically illustrated in FIGS. 14 and 15 are implemented based on programs and are run in the measurement and drive control unit MDC of the scanner device, where they are symbolized by block 120. However, it would also be possible for these functions to be run in the external computer C, in which case the measurement and drive control unit MDC of the scanner device is activated accordingly.

This present patent application is based on European Patent Application No. 06 126 907.2, filed on Dec. 21, 2006, with the European Patent Office, the contents and disclosure of which is hereby incorporated by reference herein in its entirety.

The invention claimed is:

1. Scanner device for measuring the color properties of a measured object pixel by pixel, comprising:
    a color measuring head that is adapted to be moved in at least one dimension across a measurement object to be measured, the color measuring head including at least one illuminating channel and a collection channel, wherein the illuminating channel including a light source and optical means for illuminating the measured object at a measurement site at a mean angle of incidence of 45°, and wherein the collection channel includes optical means for capturing measurement light emitted from the measured object at the measurement site at a mean collection angle of 0° and coupling it into a light guide which directs the captured measurement light to a wavelength-selective photoelectric transformer, which is adapted to resolve the captured measurement light into a number of wavelength ranges and to generate an electric measurement signal corresponding to each wavelength range,
    wherein the optical means in the illuminating channel comprises collimation optics, a field aperture, symmetrical telecentric imaging optics and a polarization filter,
    wherein the optical means in the collection channel comprises imaging optics, a field aperture and coupling optics,
    wherein the collimation optics collimate the illuminating light emanating from the light source, thereby illuminating the field aperture of the at least one illuminating channel essentially homogeneously axially parallel,
    wherein the polarization axis of the polarization filter is tilted so as to be oriented at an angle of 45° with respect to the plane of incidence onto the measured object,
    wherein the symmetrical telecentric imaging optics are adapted to reproduce the field aperture sharply in a measurement plane, thereby creating an illuminating speckle,
    wherein the imaging optics in the collection channel reproduce the field aperture sharply in the measurement plane within the illuminating speckle and a measurement speckle is defined by the image of the field aperture, and
    wherein the collection channel is adapted to capture measurement light emanating only from the measurement speckle and to couple the captured measurement light via the coupling optics into the light guide.

2. Scanner device according to claim 1, further comprising a polarization filter is disposed in the collection channel.

3. Scanner device according to claim 1, wherein the coupling optics are based on a telecentric layout.

4. Scanner device according to claim 1, wherein the field aperture in the illuminating channel is inclined by 45° with respect to the optical path, and the illuminating channel has a deflector mirror disposed downstream of the field aperture in the optical path, which deflects the illuminating optical path by 45°.

5. Scanner device according to claim 1, wherein the optical means in the illuminating channel includes an apodization means in the optical path disposed between the light source and the collimation optics to improve the homogeneity of the illumination of the field aperture.

6. Scanner device according to claim 1, wherein the collection channel is equipped with a protective window disposed at the measured object end.

7. Scanner device according to claim 1, wherein the color measuring head is equipped with a UV-illuminating channel for applying UV light to the measured object, and the UV-illuminating channel has a dichroic filter which is transparent to visible light for reflecting UV light, which is disposed at an angle in the optical path of the collection channel and reflects UV light emanating from a UV-light source into the optical path of the collection channel.

8. Scanner device according to claim 7, wherein the UV-illuminating channel has an aperture which is reproduced in the measuring plane by the imaging optics in the collection channel.

9. Scanner device according to claim 1, wherein the color measuring head is provided with two or more illuminating channels.

10. Scanner device according to claim 9, wherein the field apertures in the two or more illuminating channels are of at least partially different shapes, partially different sizes, or both partially different shapes and partially different sizes.

11. Scanner device according to claim 9, wherein two illuminating channels are disposed at an angle of 90° with respect to the collection channel so that the measured object is illuminated from two spatial directions disposed at an angle of 90° by reference to the normal onto the measured object at the measurement site.

12. Scanner device according to claim 9, wherein four illuminating channels are provided, which are disposed respectively at an angle of 90° by reference to the collection channel so that two illuminating channels sit respectively diametrically opposite one another.

13. Scanner device according to claim 12, wherein the collection channel has a polarization filter and two adjacent illuminating channels disposed at an angle of 90° with respect to one another are each provided with a polarization filter and the two other adjacent illuminating channels do not have polarization filters.

14. Scanner device according to claim 1, wherein the color measuring head has a gloss measuring channel which is disposed diametrically opposite the illuminating channel or one of the illuminating channels and captures light reflected from the measured object.

15. Scanner device according to claim 14, wherein the gloss measuring channel is essentially of the same design as the illuminating channel except that the light source and collimation optics are omitted and the field aperture reflects, and the measurement light is coupled via second coupling optics and a second light guide into a second wavelength-selective transformer.

16. Scanner device according to claim 1, further comprising a support surface for the measured object, a drive unit for moving the color measuring head across the support surface in at least one dimension thereof and for adjusting the height of the color measuring head in the direction perpendicular to the support surface, and a measurement and drive control unit activating the drive unit and cooperating with the color measuring head.

17. Scanner device according to claim 16, further comprising a distance control system which adjusts the distance of the color measuring head above the measurement site in the direction perpendicular to the support surface to a desired measuring distance for every measurement point.

18. Scanner device according to claim 17, wherein the distance control system takes a planarity measurement of the support surface and stores the planarity measurement values $z_P$ obtained as a result, and adjusts the distance of the color measuring head taking account of the stored planarity values.

19. Scanner device according to claim 18, wherein for the planarity measurement, the distance control system determines the desired heights $z_P$ of the color measuring head in a grid of measurement points distributed across the support surface from above these measurement points and stores them as planarity measurement values $z_P$.

20. Scanner device according to claim 17, wherein the distance control system takes a measurement of and stores the thickness of the measured object and adjusts the distance of the color measuring head taking account of the stored thickness of the measured object.

21. Scanner device according to claim 20, wherein in order to measure the thickness of the measured object, the distance control system determines the desired height of the color measuring head above a measurement point on the measured object and the desired height of the color measuring head above a point lying on the support surface underneath this measurement point and stores the difference between these two desired heights as the thickness of the measured object.

22. Scanner device according to claim 17, wherein the distance control system determines the desired height of the color measuring head at a measurement point derived from measurement values measured with the color measuring head at different height settings thereof at the measurement point.

23. Scanner device according to claim 17, wherein the distance control system determines the height setting of the color measuring head in the vicinity of which the measurement values measured with the color measuring head vary least as being the desired height of the color measuring head at a measurement point.

24. Scanner device according to claim 16, further comprising a tracking control system for the color measuring head which detects the position of a track to be scanned on the measured object and guides the color measuring head along this track.

25. Scanner device according to claim 16, further comprising a calibrated white reference tile of long-term stability and a white reference strip disposed on the support surface, and the measurement and drive control unit is designed to run the white calibration of the scanner device on the basis of white measurements on the white reference strip, and these white measurements are calibrated by means of transfer measurements taken on the calibrated white reference tile beforehand.

26. Scanner device according to claim 16, further comprising a white reference strip disposed on the support surface and the measurement and drive control unit is designed to correct by computation measurement values measured by the color measuring head at a distance at variance with the correct desired measurement distance so that they correspond to white measurement values measured at the correct desired measuring distance.

27. Scanner device according to claim 1, wherein the wavelength-selective photoelectric transformer is in the form of a spectrometer.

28. Scanner device according to claim 1, wherein the polarization filter is permanently mounted at the measured object end.

* * * * *